(12) United States Patent
Osaki

(10) Patent No.: US 10,055,496 B2
(45) Date of Patent: Aug. 21, 2018

(54) CUISINE SEARCH DEVICE, CUISINE SEARCH METHOD, PROGRAM, AND COMPUTER-READABLE STORAGE MEDIUM

(71) Applicant: Rakuten, Inc., Tokyo (JP)

(72) Inventor: Shoichi Osaki, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 513 days.

(21) Appl. No.: 14/404,474

(22) PCT Filed: Dec. 26, 2012

(86) PCT No.: PCT/JP2012/083686
§ 371 (c)(1),
(2) Date: Nov. 28, 2014

(87) PCT Pub. No.: WO2013/179523
PCT Pub. Date: Dec. 5, 2013

(65) Prior Publication Data
US 2015/0120705 A1    Apr. 30, 2015

(30) Foreign Application Priority Data
May 31, 2012 (JP) ................................ 2012-125517

(51) Int. Cl.
*G06F 17/30* (2006.01)
(52) U.S. Cl.
CPC ............................. *G06F 17/30864* (2013.01)
(58) Field of Classification Search
None
See application file for complete search history.

(56) References Cited

U.S. PATENT DOCUMENTS 5,960,440 A * 9/1999 Brenner ................... G06F 17/30
6,458,080 B1 * 10/2002 Brown ................ G06F 19/3406
600/300

(Continued)

FOREIGN PATENT DOCUMENTS

| JP | 2002-041670 A | 2/2002 |
| JP | 2003-122860 A | 4/2003 |
| JP | 2004-234411 A | 8/2004 |

OTHER PUBLICATIONS

International Search Report for PCT/JP2012/083686 dated Jan. 29, 2013.

(Continued)

*Primary Examiner* — Syed Haroon Hasan
(74) *Attorney, Agent, or Firm* — HEA Law PLLC

(57) ABSTRACT

Recipes including almost the same ingredients can be easily found. A cooking information search device obtains, in response to a user's instruction, one of a plurality of pieces of cooking information from cooking information storing means for storing the pieces of cooking information, each piece of cooking information which includes information on a plurality of ingredients and cooking procedures. The cooking information search device selects a part of the plurality of ingredients included in the obtained cooking information, and obtains related cooking information retrieved from the cooking information storing means under a condition that the retrieved related cooking information includes the part of the selected ingredients. The cooking information search device outputs data included in the obtained cooking information and the retrieved related cooking information so that the data is presented to the user.

6 Claims, 13 Drawing Sheets

(56) References Cited

U.S. PATENT DOCUMENTS

| | | | | |
|---|---|---|---|---|
| 7,890,499 B1* | 2/2011 | Boswell | G06F 17/30864 | 707/722 |
| 2002/0087644 A1* | 7/2002 | Zylka | G06F 17/3089 | 709/206 |
| 2002/0103876 A1* | 8/2002 | Chatani | G06F 17/30864 | 709/217 |
| 2002/0171674 A1* | 11/2002 | Paris | G06Q 99/00 | 715/700 |
| 2002/0194075 A1* | 12/2002 | O'Hagan | G06Q 20/201 | 705/21 |
| 2003/0187683 A1* | 10/2003 | Kirchhoff | G01G 19/4146 | 705/1.1 |
| 2006/0074763 A1* | 4/2006 | Schmid | G06Q 30/06 | 705/26.8 |
| 2009/0157752 A1* | 6/2009 | Gonzalez | G06Q 30/06 | |
| 2009/0258331 A1* | 10/2009 | Do | G09B 21/003 | 434/127 |
| 2009/0259688 A1* | 10/2009 | Do | G06F 3/016 | |
| 2009/0287644 A1* | 11/2009 | Crosby | G06F 17/30522 | |
| 2010/0299193 A1* | 11/2010 | Cosman | G06Q 30/02 | 705/14.13 |
| 2011/0213667 A1* | 9/2011 | Ierullo | G06Q 30/02 | 705/14.64 |
| 2012/0096087 A1* | 4/2012 | Curcelli | G06Q 10/101 | 709/204 |
| 2013/0149675 A1* | 6/2013 | Slone | G09B 19/00 | 434/127 |
| 2013/0149677 A1* | 6/2013 | Slone | G09B 19/0092 | 434/127 |
| 2013/0222406 A1* | 8/2013 | Wolfe | G06T 11/206 | 345/582 |
| 2014/0080102 A1* | 3/2014 | Krishna | G06Q 30/02 | 434/127 |
| 2014/0095479 A1* | 4/2014 | Chang | G06F 17/30699 | 707/722 |
| 2015/0089134 A1* | 3/2015 | Mukherjee | G06F 15/78 | 711/114 |

OTHER PUBLICATIONS

The partial translation of Office Action for corresponding Japanese Patent Application No. 2012-125517 dated Jul. 30, 2013.
The partial translation of Office Action for corresponding Japanese Patent Application No. 2012-125517 dated Jan. 7, 2014.
The partial translation of Office Action for corresponding Japanese Patent Application No. 2012-125517 dated Apr. 8, 2014.

* cited by examiner

FIG.6

SEARCH CONDITION INPUT SCREEN

INGREDIENTS POTATO

COOKING METHOD ☐ STEW ☐ SAUTE ☐ FRY ☐ TOSS
☐ STEAM ☐ PICKLE ☐ MICROWAVE

SEARCH

FIG.7

| COOKING ID | TITLE | DISH NAME | CATEGORY | COOKING METHOD | COOKING TIME |
|---|---|---|---|---|---|
| ab0001 | TRADITIONAL CURRY | CURRY RICE | MAIN | STEW | 60 MIN |
| cd3001 | HOMESTYLE PORK AND POTATO STEW | PORK AND POTATO STEW | SIDE | STEW | |
| ef1234 | PORK POT AU FEU | POT AU FEU | SIDE | STEW | |
| 10abcd | SIMPLE CROQUETTE | CROQUETTE | SIDE | MICROWAVE | |
| 20kdjf | STIR-FRIED SAUSAGE AND POTATO | STIR-FRIED POTATO | SIDE | SAUTE | 10 MIN |

FIG.8

| COOKING ID | SeqNo | INGREDIENTS | VALUE | UNIT |
|---|---|---|---|---|
| ab0001 | 1 | PORK | 200 | g |
| ab0001 | 2 | POTATO | 2 | |
| ab0001 | 3 | ONION | 2 | |
| ab0001 | 4 | CARROT | 1 | |
| ab0001 | 5 | CURRY PASTE | 80 | g |
| cd3001 | 1 | POTATO | 2 | |
| cd3001 | 2 | CARROT | 1 | |
| cd3001 | 3 | PORK | 200 | g |
| cd3001 | 4 | SOY SAUCE | 1 | TABLESPOON |
| cd3001 | 5 | SUGAR | 1 | TABLESPOON |
| cd3001 | 6 | SWEET SAKE | 1 | TABLESPOON |
| 10abcd | 1 | POTATO | 4 | |
| 10abcd | 2 | BEEF | 100 | g |
| 10abcd | 3 | BREAD CRUMB | 50 | g |
| 10abcd | 4 | EGG | 1 | |

FIG.9

| COOKING ID | PROCEDURE NO. | TEXT | IMAGE ID |
|---|---|---|---|
| ab0001 | 1 | CUT POTATOES AND CARROTS | ab0001_001.jpg |
| ab0001 | 2 | STIR-FRY POTATOES, CARROTS, AND PORK IN A PAN | |

FIG.10

DISH LIST

HOMESTYLE PORK AND POTATO STEW
    INGREDIENTS: POTATO, CARROT, PORK,....

SIMPLE CROQUETTE
    INGREDIENTS: POTATO, BEEF, BREAD CRUMB,....

STIR-FRIED SAUSAGE AND POTATO
    INGREDIENTS: SAUSAGE, POTATO, SPINACH,....

.
.
.

SEARCH CONDITION | POTATO | SEARCH

FIG.13

| USER ID | DISPLAY DATE/TIME | TRANSITION DATE/TIME | COOKING ID |
|---|---|---|---|
| Ausr | 2012/5/1 10:00 | 2012/5/1 10:04 | cd3001 |
| Ausr | 2012/5/1 10:04 | 2012/5/1 10:04 | 10abcd |
| Ausr | 2012/5/1 10:04 | 2012/5/1 10:06 | cd3001 |

CUISINE SEARCH DEVICE, CUISINE SEARCH METHOD, PROGRAM, AND COMPUTER-READABLE STORAGE MEDIUM

CROSS REFERENCE TO RELATED APPLICATIONS

This application is a National Stage of International Application No. PCT/JP2012/083686 filed Dec. 26, 2012, claiming priority based on Japanese Patent Application No. 2012-125517 filed on May 31, 2012. The contents of each of the above documents are incorporated herein by reference in their entirety.

TECHNICAL FIELD

The present invention relates to a cooking information search device, cooking information search method, a program, and a computer-readable storage medium.

BACKGROUND ART

Web sites for providing cooking recipes on the Internet are widely used. These web sites enable finding a recipe easier and convenient.

CITATION LIST

Patent Document

Patent Literature 1: JP2003-122860A

SUMMARY OF INVENTION

Technical Problem

When a user views a recipe at an existing web site that provides cooking recipes, the user often does not recognize other recipes that include some of the ingredients (e.g., main ingredients) used in the recipe. As such, for example, although another dish can be made using the some of the ingredients of the recipe, sometimes the user could not find a recipe of another dish.

One or more embodiments of the present invention have been conceived in view of the above, and an object thereof is to provide a technology for helping a user to find recipes including almost the same ingredients.

Solution to Problem

In order to solve the above described problems, a cooking information search device according to the present invention includes cooking information obtaining means for obtaining, in response to a user's instruction, one of a plurality of pieces of cooking information from cooking information storing means for storing the plurality of pieces of cooking information, each piece of cooking information which includes information on a plurality of ingredients and cooking procedures, ingredient selecting means for selecting a part of the plurality of ingredients included in the obtained cooking information, related dish search means for obtaining one or more pieces of related cooking information that is retrieved from the cooking information storing means under a condition that the retrieved related cooking information includes the part of the selected ingredients, and cooking information output means for outputting data included in the obtained cooking information and the retrieved related cooking information so that the data is presented to the user.

A cooking information search method according to the present invention includes obtaining, in response to a user's instruction, one of a plurality of pieces of cooking information from cooking information storing means for storing the plurality of pieces of cooking information, each piece of cooking information which includes information on a plurality of ingredients and cooking procedures, selecting a part of the plurality of ingredients included in the obtained cooking information, obtaining one or more pieces of related cooking information that is retrieved from the cooking information storing means under a condition that the retrieved related cooking information includes the part of the selected ingredients, and outputting data included in the obtained cooking information and the retrieved related cooking information so that the data is presented to the user.

A program according to the present invention for causing a computer to function as cooking information obtaining means for obtaining, in response to a user's instruction, one of a plurality of pieces of cooking information from cooking information storing means for storing the plurality of pieces of cooking information, each piece of cooking information which includes information on a plurality of ingredients and cooking procedures, ingredient selecting means for selecting a part of the plurality of ingredients included in the obtained cooking information, related dish search means for obtaining one or more pieces of related cooking information that is retrieved from the cooking information storing means under a condition that the retrieved related cooking information includes the part of the selected ingredients, and cooking information output means for outputting data included in the obtained cooking information and the retrieved related cooking information so that the data is presented to the user.

A computer-readable information storage medium according to the present invention stores the program described above.

According to the present invention, it is possible to more easily reach, from cooking information that is obtained based on the user's instruction, to related cooking information that includes partially the same ingredients as those included in the cooking information. As such, it is possible to easily find recipes (cooking information) including ingredients which is broadly similar to the obtained cooking information.

In one embodiment of the present invention, each of the plurality of pieces of cooking information may include information on a quantity of each of the ingredients included in the cooking information, and the ingredient selecting means may select a part of the plurality of ingredients included in the obtained cooking information based on information on a quantity of each of the plurality of ingredients included in the obtained cooking information.

In one embodiment of the present invention, the ingredient selecting means may select the ingredients based on appearance frequency of the ingredients included in the plurality of pieces of cooking information that are obtained by the cooking information obtaining means in response to the user's previous instruction.

In one embodiment of the present invention, the cooking information obtaining means may obtain, from among the plurality of pieces of related cooking information whose data is output so as to be presented to the user, a piece of related cooking information that the user instructs to display a detailed information including the cooking procedures, and the ingredient selecting means may select the ingredients based on the appearance frequency of the ingredients included in the plurality of pieces of cooking information including the related cooking information obtained by the cooking information obtaining means in response to the user's previous instruction.

In one embodiment of the present invention, each of the plurality of pieces of cooking information may include information on a rank of each of the ingredients included in the cooking information, and the ingredient selecting means may select a part of the ingredients included in the obtained cooking information based on the rank of each of the ingredients included in the obtained cooking information.

In one embodiment of the present invention, the ingredient selecting means may select a part of the ingredients that are included in the obtained cooking information and not associated with a predetermined attribute.

In one embodiment of the present invention, the cooking information obtaining means may obtain one of the plurality of pieces of cooking information based on a search condition entered by the user, and the related dish search means may obtain the retrieved related cooking information under a condition that the retrieved related cooking information includes the part of the selected ingredients and satisfies the search condition.

In one embodiment of the present invention, each of the plurality of pieces of cooking information may include a dish name, and the related dish search means may obtain the retrieved related cooking information under a condition that the retrieved related cooking information includes the part of the selected ingredients and a dish name that is different from a dish name included in one of the pieces of cooking information.

In one embodiment of the present invention, each of the plurality of pieces of cooking information may include a dish name, and the related search means may obtain the retrieved related cooking information under a condition that the retrieved related cooking information includes the part of the selected ingredients based on the appearance frequency of the dish name included in the plurality of pieces of cooking information obtained by the cooking information obtaining means in response to the user's previous instruction.

BRIEF DESCRIPTION OF DRAWINGS

FIG. 6 A diagram illustrating an example of a search condition input screen.

FIG. 7 A diagram illustrating an example of content of a cooking table.

FIG. 8 A diagram illustrating an example of content of a cooking ingredient table.

FIG. 9 A diagram illustrating an example of content of a cooking procedure table.

FIG. 10 A diagram illustrating an example of a dish list screen.

FIG. 13 A diagram illustrating an example of history information stored in a viewing history storing unit.

DESCRIPTION OF EMBODIMENTS

An embodiment of the present invention will be described below in detail with reference to the accompanying drawings. Regarding the elements designated with the same numerals, their overlapping explanation will be omitted unless they have different functions.

Figure 1:
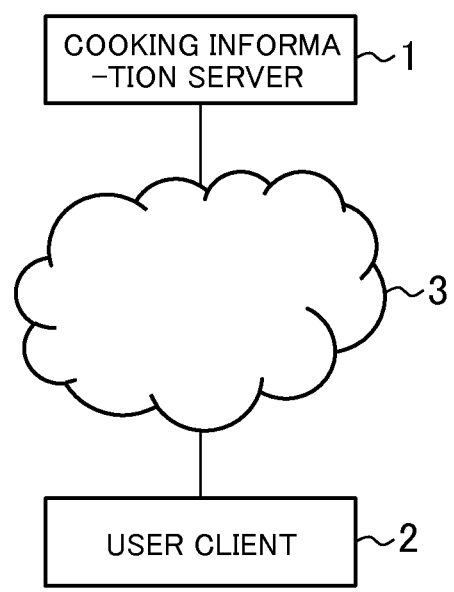
FIG. 1 A diagram illustrating an example of a cooking information viewing system according to an embodiment of the present invention.

FIG. 1 is a diagram illustrating an example of a cooking information viewing system according to an embodiment of the present invention. The cooking information viewing system includes a cooking information server 1 and a user client 2. They are connected to each other through the Internet 3, which is a type of networks.

The cooking information server 1 is a server for a user to view cooking recipes (also referred to as cooking information in the following). The user client 2 is a computer that the user operates, such as a personal computer.

Figure 2:
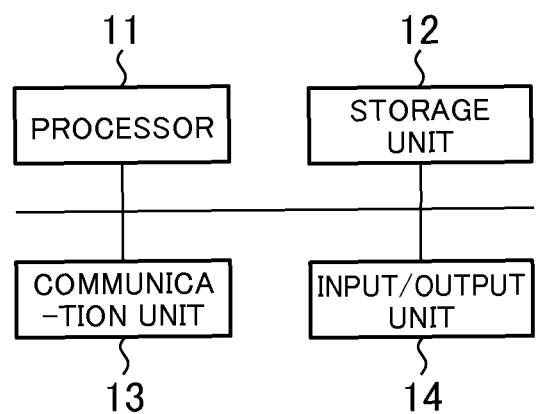
FIG. 2 A diagram illustrating an example of a cooking information server according to the embodiment of the present invention.

FIG. 2 is a diagram illustrating an example of a hardware configuration of the cooking information server 1 according to the embodiment of the present invention. The cooking information server 1 includes a processor 11, a storage unit 12, a communication unit 13, and an input/output unit 14. The cooking information server 1 may be a server computer installed in a data center, for example.

The processor 11 operates according to a program stored in the storage unit 12. The processor 11 controls the communication unit 13 and the input/output unit 14. The program may be provided through a network such as the Internet, or stored in a computer-readable storage medium such as a DVD-ROM to be provided.

The storage unit 12 includes a memory device such as a RAM or a flash memory, and a hard disk drive. The storage unit 12 stores the program. The storage unit 12 stores information and computational results input from each unit.

The communication unit 13 implements functions to communicate with other devices such as the user client 2, and includes, for example, an integrated circuit constituting a wired LAN and a network card having a communication terminal. The communication unit 13 inputs information received from other devices into the CPU 11 or the storage unit 12, and sends information to other devices based on the control of the CPU 11.

The input/output unit 14 is a circuit for exchanging data with a display output device or an input device, and includes, for example, a graphic board for outputting images on the display output device, and a USB controller obtaining data from an input device such as a keyboard and a mouse. The input/output unit 14 outputs image data to the display output device and obtains information from an operator (user) using the input device, based on the control of the processor 11.

Figure 3:
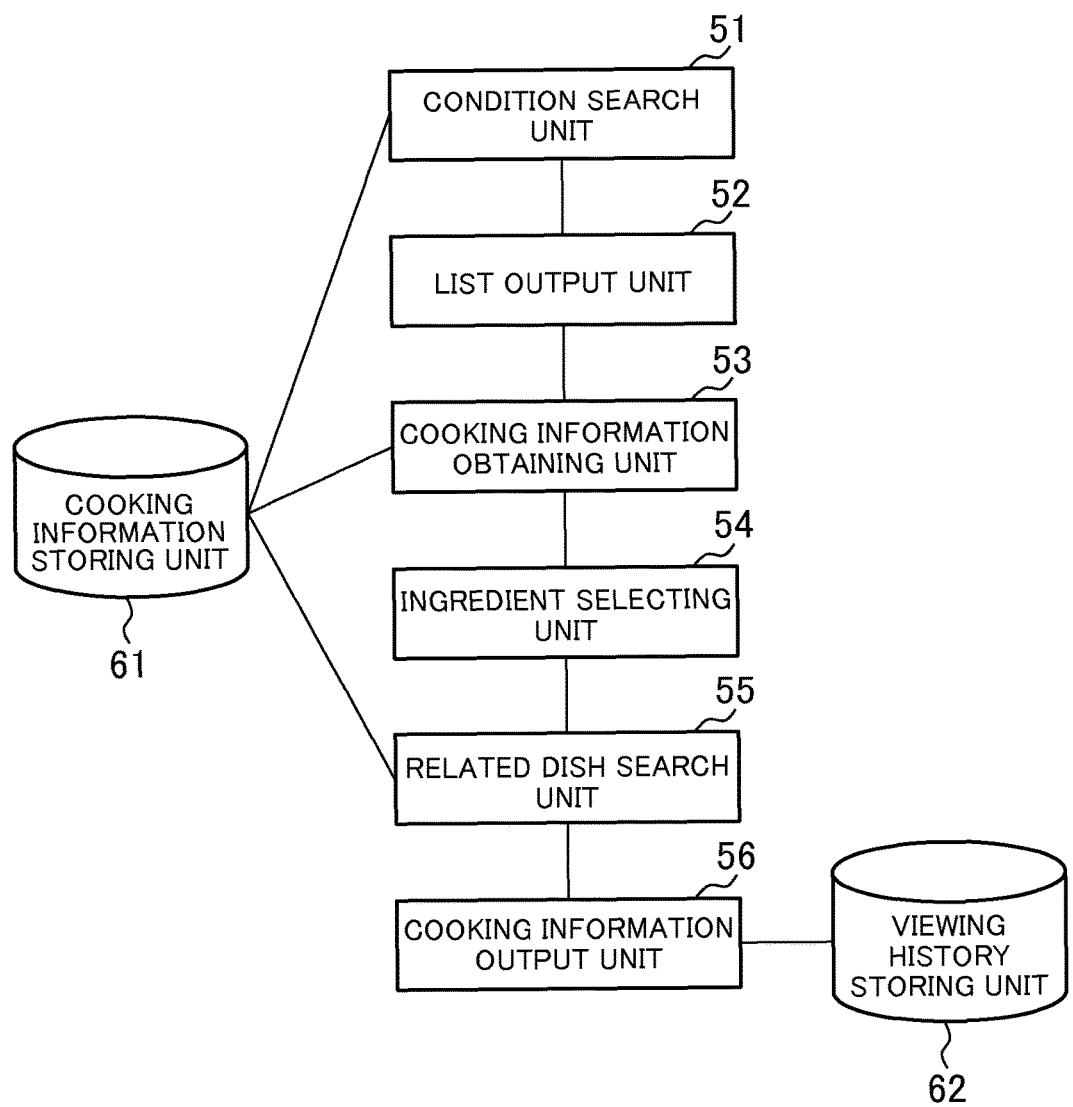
FIG. 3 A functional block diagram illustrating functions implemented by the cooking information server according to the embodiment of the present invention.

FIG. 3 is a functional block diagram showing functions implemented by the cooking information server 1 according to the embodiment of the present invention. The cooking information server 1 functionally includes a condition search unit 51, a list output unit 52, a cooking information obtaining unit 53, an ingredient selecting unit 54, a related dish search unit 55, a cooking information output unit 56, a cooking information storing unit 61, and a viewing history storing unit 62. These functions are implemented by the processor 11 executing the program stored in the storage unit 12 and controlling the communication unit 13, for example. The cooking information storing unit 61 and the viewing history storing unit 62 are implemented mainly by the storage unit 12 of the cooking information server 1, and may also be implemented by a memory device included in other server. Alternatively, the cooking information storing unit 61 may be implemented by a database management system composed of the storage unit 12 and the processor 11, or a database management system included in other server. In addition, at least a part of the functions of the cooking information server 1 (e.g., condition search unit 51, list output unit 52, cooking information obtaining unit 53, ingredient selecting unit 54, related dish search unit 55, and cooking information output unit 56) may be implemented in a personal computer or a smartphone that the user uses. The cooking information obtaining unit 53, the ingredient selecting unit 54, the related dish search unit 55, the cooking information output unit 56, and the cooking information storing unit 61 respectively correspond to cooking information obtaining means, ingredient selecting means, related dish search means, cooking information output means, and cooking information storing means in Claims.

Figure 4:
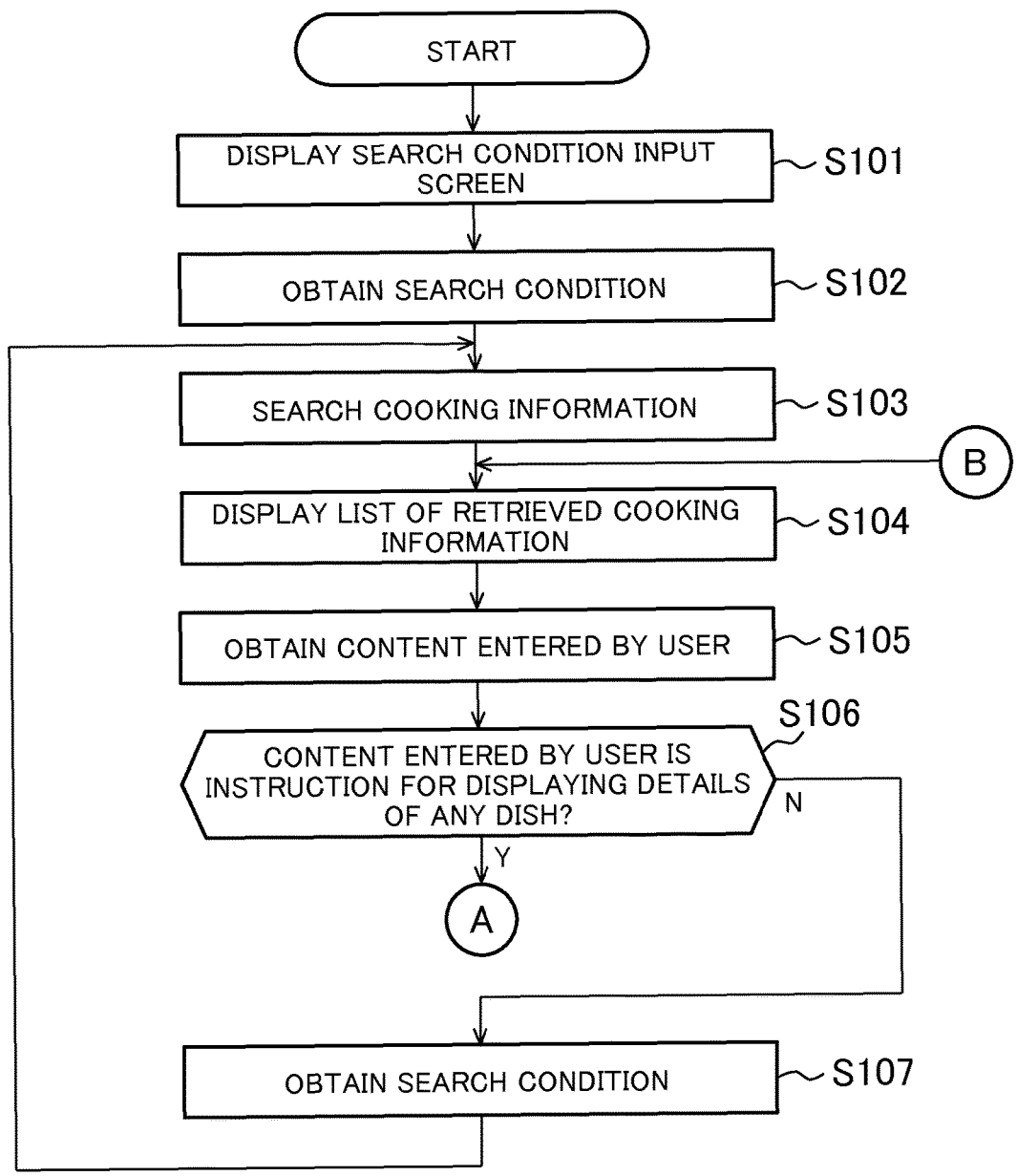
FIG. 4 A diagram illustrating an example of a flow of processing performed by the cooking information server according to the embodiment of the present invention.
Figure 5:
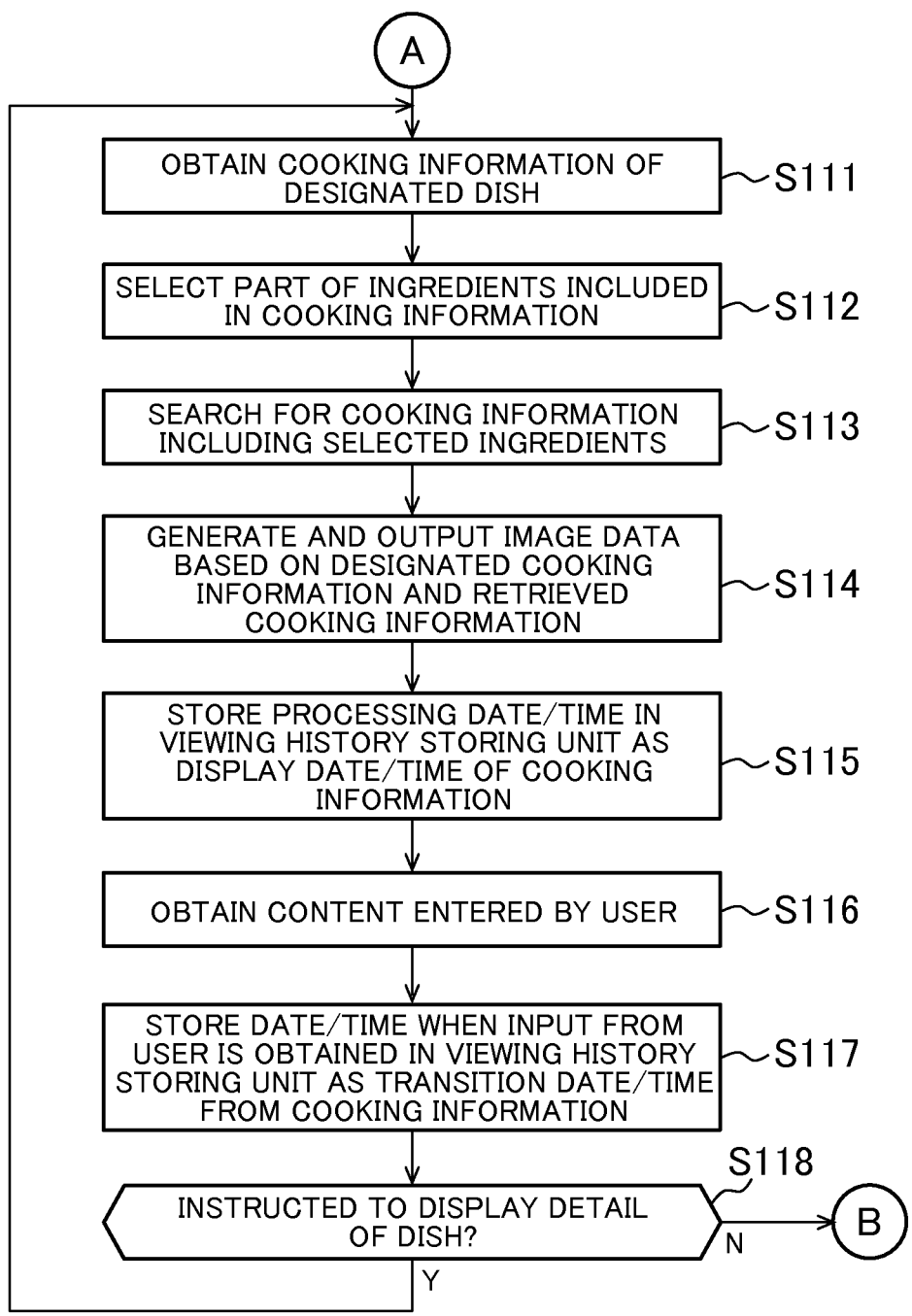
FIG. 5 A diagram illustrating an example of a flow of processing performed by the cooking information server according to the embodiment of the present invention.

FIGS. 4 and 5 are diagrams respectively illustrating examples of processing flow of the cooking information server 1 according to the embodiment of the present invention. In the following, functions implemented by the cooking information server 1 are described in accordance with the processing flow.

The condition search unit 51 is mainly implemented by the processor 11, the storage unit 12, and the communication unit 13. The condition search unit 51 obtains a search condition from the user, and searches for cooking information that satisfies the search condition. First, the condition search unit 51 generates image data for displaying a search condition input screen used for searching cooking information, and sends the generated data to the user client 2 (Step S101). The user client 2 then displays the search condition input screen based on the received image data.

FIG. 6 is a diagram illustrating an example of the search condition input screen. On the search condition input screen, a field for inputting the search condition and a "search" button are placed. In the example shown in FIG. 6, the search condition includes cooking ingredients and cooking methods. The ingredients are entered in the input field, and the cooking methods are entered in the checkboxes. When the user inputs ingredients and cooking methods in the search condition input screen and then presses the "search" button, the user client 2 sends the search condition to the condition search unit 51. In this regard, other types of conditions (e.g., dish name or category described later) may be entered as the search condition.

Next, the condition search unit 51 obtains the search condition sent from the user client 2 (Step S102). The condition search unit 51 then searches cooking information stored in the cooking information storing unit 61 using the obtained search condition as a key (Step S103). Here, the cooking information storing unit 61 stores a plurality of pieces of cooking information. Further, a piece of cooking information corresponds to one dish, and includes a plurality of pieces of ingredient information and procedures. Here, the cooking information is specified by a cooking ID, and stored separately in a cooking table, a cooking ingredient table, and a cooking procedure table.

FIGS. 7, 8, and 9 are diagrams respectively illustrating examples of the cooking table, cooking ingredient table, and cooking procedure table. The records of the cooking table are specified by the cooking IDs, and each record in the cooking table includes a cooking ID, dish name, category of the dish, classification of cooking method, and cooking time, from among the cooking information. The title is a name representing a dish indicated by the cooking information, and the dish name is a generic name indicating the dish. The category indicates a category of the dish, and may be roughly classified into main dishes and side dishes, or more precisely classified into, for example, rice bowl dishes and noodles. The classification of cooking method indicates general cooking methods, such as stew, roast, and microwave. The cooking time indicates approximate time required for cooking when the procedures shown in the cooking information are followed.

In the cooking ingredient table, multiple records are included in one piece of cooking information. One record corresponds to one of the ingredients, and the number of the records is the same as the number of the ingredients. One of the records in the cooking ingredient table is specified by the cooking ID and a sequential number (ranking in the records having the same cooking ID). Each record in the cooking ingredient table includes an ingredient name and information on quantity of one of the ingredients included in the cooking information. The quantity is information on, for example, weight, number of items, or volume. The quantity is divided into a value and a unit and stored in the record. For example, if the quantity is 200 g, "200" is stored in the value of the quantity, and "g" is stored in the unit of the quantity.

The cooking procedure table includes multiple records for each piece of the cooking information, and one record corresponds to one procedure. The records of the cooking procedure table are specified by the cooking IDs and procedure numbers. Each record in the cooking procedure table includes a text explaining one procedure and an image ID of an image included in the cooking information. For simplicity, only the portion of the records is shown in FIGS. 7 to 9.

In Step S103, if an ingredient is specified as a search condition, the condition search unit 51 searches for a record including the specified ingredient in the ingredients in the cooking ingredient table. If a cooking method is specified as a search condition, the condition search unit 51 searches for a record including the specified cooking method in the cooking method classifications in the cooking table. The same applies to cases where a dish name or a category is specified as a search condition. The condition search unit 51 may conduct a search by combining the search conditions. The condition search unit 51 obtains one or more pieces of cooking information having the cooking ID of the record retrieved by the search condition. In this regard, the condition search unit 51 may search for the record by directly accessing data of the records included in the cooking information storing unit 61. Alternatively, the condition search unit 51 may search for the record by sending a query indicated by the search condition to the database management system included in the cooking information storing unit 61, and obtaining the results of the query from the database management system.

The list output unit 52 is mainly implemented by the processor 11, the storage unit 12, and the communication unit 13. The list output unit 52 outputs, to the user client 2, image data for displaying a dish list screen on which a list of searched cooking information is viewed (Step S104). The user client 2 controls the display output device connected to the user client 2 (or included in the user client 2) to output the dish list screen to the user based on the image data. That is, the list output unit 52 performs control so as to display the dish list screen on the display output device viewed by the user.

FIG. 10 is a diagram illustrating an example of the dish list screen. The dish list screen shown in FIG. 10 displays a list of dishes according to the pieces of cooking information satisfying the search condition. In the list, items of cooking information to be displayed are a title and a part of ingredients. FIG. 10 shows examples of dishes retrieved from the cooking information shown in FIGS. 7 to 9 in a case where "potato" is specified as a search condition. In this case, the number of search results is large, and thus a part of the pieces of the cooking information that includes "potato" as one of the ingredients is displayed on the dish list screen.

A title of a dish listed in the dish list screen has a link, and when a user clicks on the link, a cooking ID of the dish corresponding to the clicked title is sent to the cooking information server 1 as an instruction to display details of the dish. In the lower part of the dish list screen, a field to enter a search condition and a search button are disposed. When a new search condition is entered in the field for entering the search condition and the "search" button is pressed, the search condition and the instruction to search are sent to the cooking information server 1.

Next, the list output unit 52 obtains content that the user has entered through the dish list screen (Step S105). If the content entered by the user is an instruction for displaying details of any of the dishes (Y in Step S106), processing in Step S111 and subsequent steps are performed. If the content entered by the user is an instruction for search (N in Step S106), the list output unit 52 obtains the search condition (Step S107), and repeats the processing in Step S103 and subsequent steps.

The cooking information obtaining unit 53 is implemented mainly by the processor 11 and the storage unit 12. The cooking information obtaining unit 53 obtains one of the pieces of the cooking information stored in the cooking information storing unit 61 based on the instruction by the user for displaying the details (Step S111). In particular, the cooking information obtaining unit 53 may obtain cooking information by searching the cooking table, cooking ingredient table, and cooking procedure table with use of, as a key, the cooking ID of the recipe selected by the user through the dish list screen in order to display details of the recipe. Alternatively, the condition search unit 51 or the list output unit 52 may cache the search result in the storage unit 12, and obtain cooking information from the cache.

The ingredient selecting unit 54 is implemented mainly by the processor 11 and the storage unit 12. The ingredient selecting unit 54 selects a part of the ingredients included in the cooking information obtained by the cooking information obtaining unit 53 (Step S112). Here, the ingredients to be selected are the ingredients more likely to be used by the user from among the ingredients included in the cooking information.

Figure 11:
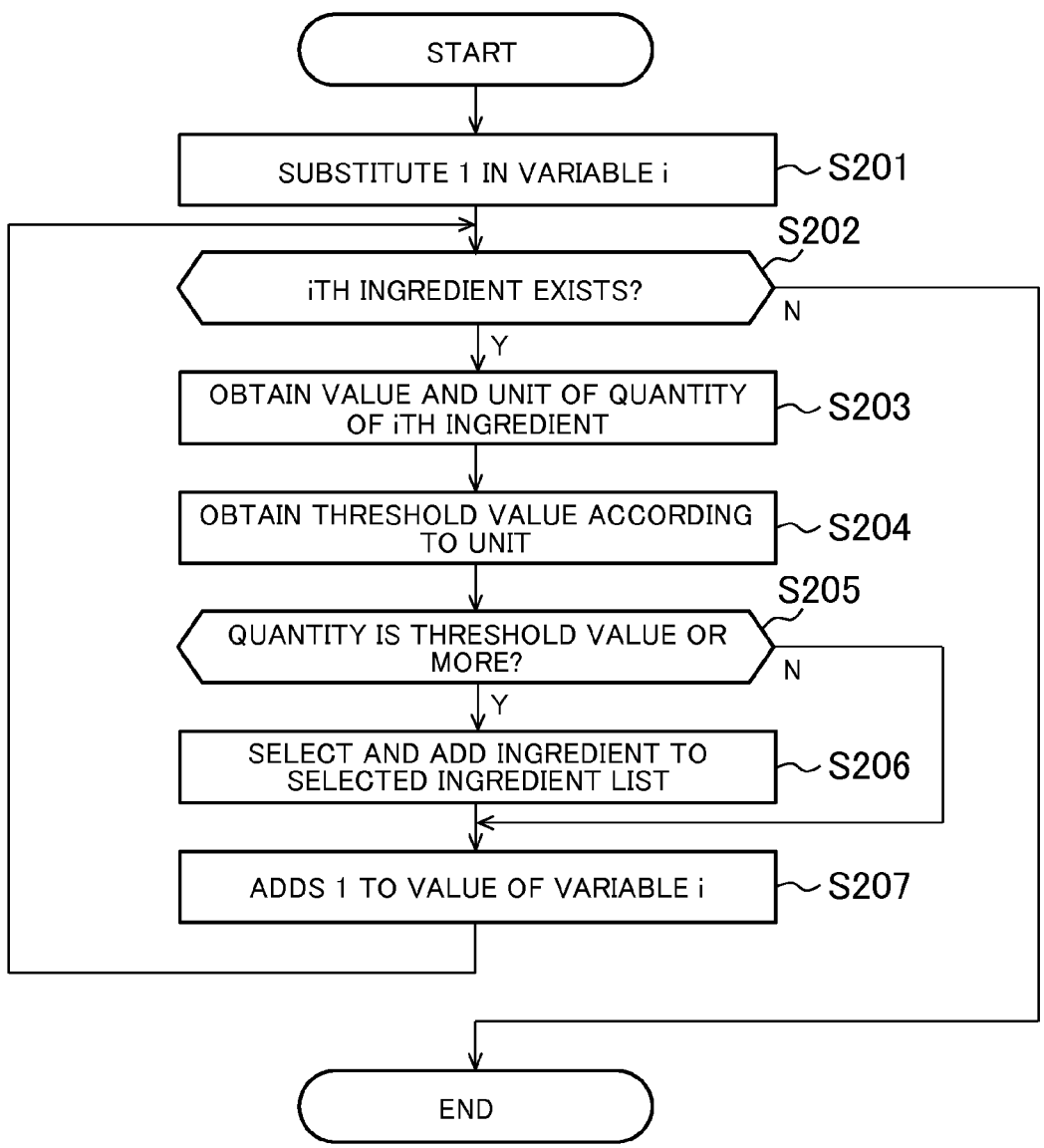
FIG. 11 A diagram illustrating an example of a flow of processing performed by an ingredient selecting unit.

FIG. 11 is a diagram illustrating an example of processing flow of the ingredient selecting unit 54. In the following, referring to FIG. 11, the processing in Step S112 is explained in detail. At first, the ingredient selecting unit 54 substitutes 1 in a variable i (Step S201). The ingredient selecting unit 54 then checks if the cooking information includes information on ith ingredient (Step S202). The information on the ith ingredient indicates content of the record that has a sequential number "i" in the cooking ingredient table. If there is no information on the ith ingredient (N in Step S202), the processing of the ingredient selecting unit 54 is finished. If there is information on the ith ingredient (Y in Step S202), the ingredient selecting unit 54 obtains information on a value and a unit of the quantity of the ith ingredient (Step S203). The ingredient selecting unit 54 obtains a threshold value that is predetermined according to the obtained unit (Step S204). If a value of a quantity is the threshold value or more (Y in Step S205), such ingredient is selected and added to the selected ingredient list (Step S206). If a value of a quantity is less than the threshold value (N in Step S205), the processing of Step S206 is skipped. Subsequently, the ingredient selecting unit 54 adds 1 to the value of the variable i (Step S207), and repeats processing from Step S202.

The above mentioned processing of the ingredient selecting unit 54 selects the ingredient for the quantity that exceeds the threshold value predetermined for each unit of the quantity, from among the ingredients included in the obtained cooking information. In the usual case, a plurality of ingredients are selected from the cooking information.

For example, in a case where a quantity is determined in advance such that a threshold value of a unit "g" is 100 and "number of items" is 1, and a link of "homestyle pork and potato stew" (cooking ID:cd3001) is clicked on the dish list screen shown in FIG. 10, "potato", "carrot", and "pork", which respectively exceed the threshold values corresponding to the units of the quantity, are selected from the ingredients included in the cooking information.

The related dish search unit 55 is implemented mainly by the processor 11 and the storage unit 12. The related dish search unit 55 searches for related dishes (Step S113). The related dish search is processing for searching, from the cooking information stored in the cooking information storing unit 61, cooking information (related cooking information) including the ingredients selected by the ingredient selecting unit 54. In particular, the related dish search unit 55 searches for related cooking information that satisfies a condition in which the ingredients selected by the ingredient selecting unit 54 are included, the search condition used by the condition search unit 51 is satisfied, and a dish name is different from the dish name included in the cooking information that the cooking information obtaining unit 53 has obtained. In this regard, if the search condition entered by the user includes a dish name, the related dish search unit 55 searches for related cooking information that includes the ingredients selected by the ingredient selecting unit 54 and satisfies the search condition that the condition search unit 51 has used. In a case where the search condition entered by the user includes a dish name, instead of performing the search as mentioned above, the related dish search unit 55 may search for related cooking information that includes the ingredients selected by the ingredient selecting unit 54 and has a dish name different from the dish name included in the cooking information obtained by the cooking information obtaining unit 53.

The related cooking information that the related dish search unit 55 obtains by performing the search is proposed (presented) to the user as a dish related to the dish that the user has instructed to display details thereof. At the time when searching for cooking information on a related dish for a proposal, it is possible to narrow the search to cooking information that better matches the user's intentions by using not only the ingredients but also the search condition used by the condition search unit 51. In addition, the cooking information having the same dish name is excluded from the search result, and thus a range of the proposed dishes would be expected to be widened to some extent. In Step S113, the related dish search unit 55 searches for related cooking information by directly accessing data of the record included in the cooking information storing unit 61.

In a case where the cooking information storing unit 61 is a database management system, and the cooking information storing unit 61 is physically separated from the related dish search unit 55 (e.g., a case where the cooking information server 1 does not have a cooking information storing unit 61 or the user client 2 has a related dish search unit 55), the related dish search unit 55 may provide the database management system included in the cooking information storing unit 61 with a query indicating a search condition for searching for related cooking information, and obtain the result of the query by the database management system so as to search for the related cooking information. In this case, the related dish search unit 55 can obtain the related cooking information searched by the cooking information storing unit 61 under the condition that a part of the ingredients selected by the ingredient selecting unit 54 are included in the related cooking information.

The cooking information output unit 56 is implemented mainly by the processor 11, the storage unit 12 and the communication unit 13. The cooking information output unit 56 outputs, to the user, data based on the related cooking information searched by the related dish search unit 55. In particular, the cooking information output unit 56 outputs, to the user client 2 of the user, the designated cooking information and information indicating a title and ingredients included in the related cooking information searched by the related dish search unit 55 (Step S114). This information may be image data of the cooking information screen including the title and the ingredients as elements, or string data itself of the title and the ingredients. In the case of the string data, the user client 2 generates a cooking information screen based on the information, and displays the generated screen.

When the user client 2 receives data included in the cooking information, which is instructed by the user to be displayed, and the related cooking information, the display output device connected to (or included in) the user client 2 displays the cooking information screen. In this way, data included in the cooking information instructed by the user to be displayed and the related cooking information is presented to the user.

In a case where the user client 2 has the cooking information obtaining unit 53, the related dish search unit 55, and the cooking information output unit 56, the display output device provided to or connected to the user client 2 functions as the cooking information output unit 56. In this case, the cooking information output unit 56 displays data included in the cooking information obtained by the cooking information obtaining unit 53 and the related cooking information obtained by the related dish search unit 55. In this way, data included in the cooking information instructed to be displayed by the user and the related cooking information is presented to the user.

Figure 12:
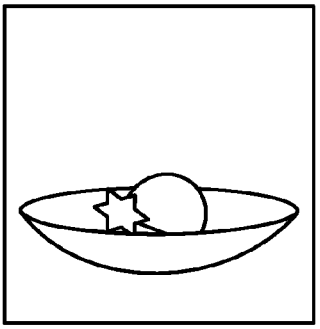
FIG. 12 A diagram illustrating an example of a cooking information screen.

FIG. 12 is a diagram illustrating an example of the cooking information screen. On the center and the left side of the cooking information screen, information on a dish instructed by the user to be displayed in detail is displayed. Information items arranged on the cooking information screen includes a title of the dish, dish name, ingredients, and procedures. On the right side of the cooking information screen, a list of pieces of related cooking information searched and obtained by the related dish search unit 55 is placed. In the list, a title of a dish and a part of the ingredients are displayed for each of the pieces of related cooking information. In the example shown in FIG. 12, the related dish search unit 55 searches for dishes including the ingredients "potato", "carrot", and "pork" selected by the ingredient selecting unit 54, and the result of searched dishes, such as "traditional curry" (cooking ID:ab0001), is displayed on the right side of the cooking information screen. As indicated by the sentence "If you have cabbage, try this:" shown in FIG. 12, the cooking information output unit 56 may display, on the cooking information screen, information including the ingredients that are used in any of the listed dishes and are different from the ingredients used in the dish instructed by the user to be displayed in detail. In this regard, when any one of the titles of the listed dishes is clicked, an instruction (in particular, cooking ID) for displaying the dish in detail is sent to the cooking information server 1. Then, when a "Return to list" button is pressed, such information is sent to the cooking information server 1.

As described above, when information on the dish for which the user requests to display a detail thereof is displayed on the screen, information on other dishes that includes the ingredients of the requested dish is also output on the screen. In this way, it is possible to save the time and effort to search for the dishes using similar ingredients.

The cooking information output unit 56 stores history information on the cooking information, which includes the related cooking information that is obtained and output according to the instruction of the user, into the viewing history storing unit 62. First, when outputting image data of the cooking information screen, the cooking information output unit 56 simultaneously stores the processing date and time in the viewing history storing unit 62 as the display date and time of the cooking information (Step S115). FIG. 13 is a diagram illustrating an example of history information stored in the viewing history storing unit 62. The history information includes a user ID of an operating user, cooking ID, display date and time, and transition date and time. At this point, a record of a user ID, cooking ID of the displayed dish, and display date and time is newly stored among from viewing information.

Subsequently, the cooking information output unit 56 obtains the content entered by the user through the cooking information screen (Step S116). The cooking information output unit 56 then stores the date and time, on which the input from the user is obtained, into the viewing history storing unit 62 as the transition date and time from the cooking information (Step S117). In particular, the date and time is updated in the column of the transition date and time of the record that is generated in Step S115 regarding the cooking information (its cooking ID). In this way, the viewing history storing unit 62 stores history of the cooking information that is obtained by the cooking information obtaining unit 53 in response to instructions of the user in the past and viewed by the user.

If the content entered by the user through the cooking information screen is an instruction to display related dishes (Y in Step S118), the processing is repeated from Step S111. In this case, for example, clicking a title of a related dish on the cooking information screen applies to such instruction. In this case, the processing is back to Step S111, and the cooking information obtaining unit 53 obtains the cooking information on the related dish clicked by the user. With this, the cooking information obtaining unit 53 obtains the related cooking information that the user has instructed to display its detailed information among from a plurality of pieces of related cooking information with the titles output to be presented to the user. The cooking information output unit 56 displays the instructed related cooking information, and stores history information of the related cooking information in the viewing history storing unit 62. If the user inputs an instruction to return to the list display (N Step S118), the processing is repeated from Step S104.

In the above description, although the ingredient selecting unit 54 selects a part of the ingredients by using the quantity of the ingredients included in the cooking information, the ingredients may be selected in other ways.

For example, the ingredient selecting unit 54 may select a part of the ingredients included in a plurality of pieces of cooking information, which are instructed (selected) by the user to display in details not only in this time but also in the past and are displayed on the cooking information screen with their cooking processes. In this way, the ingredients are selected based on appearance frequency of the ingredients included in the pieces of cooking information obtained by the cooking information obtaining unit 53 based on the user's instruction in the past. In this regard, "a plurality of pieces of cooking information" includes related cooking information. Specifically, at first, the ingredient selecting unit 54 obtains cooking IDs of a record having a display date and time within a predetermined period of time (e.g., within 30 minutes from the present time) from among the history information stored in the viewing history storing unit 62. Subsequently, the ingredient selecting unit 54 totals appearance frequencies of the ingredients included in the cooking information indicated by the cooking IDs. The ingredient selecting unit 54 then selects the ingredients having the predetermined number or more of the totaled appearance frequencies. Here, the appearance frequency may be the number of times the ingredients appear, or the total of time in which the dishes using the ingredients are viewed (the total of time can be obtained by deducting the display date and time from the transition date and time).

As described, the cooking information viewed in the past is also used, and thus the ingredients that the user wishes to use can be selected with higher probability, and the user can save more time and effort.

In addition, a blacklist for ingredients (excluded ingredients) that are not selected may be prepared in order for the ingredient selecting unit 54 to select ingredients other than the ingredients included in the blacklist. For example, if the ingredients that the user highly likely has at all times, such as seasoning, are put in the blacklist, it is possible to avoid excessively narrowing the condition of the ingredients. By excluding the seasoning from the ingredients to be selected, a possibility of providing the user with recipes having considerably different tastes is increased, even if the recipes use the same selected ingredients, and thus wide variations of recipes can be presented to the user.

Based on the rankings of the ingredients included in the cooking information obtained by the cooking information obtaining unit 53, the ingredient selecting unit 54 may select a part of the ingredients. In particular, the ingredient selecting unit 54 may obtain, from the cooking information obtained by the cooking information obtaining unit 53, the ingredient having a sequential number equal to or smaller than a predetermined number (e.g., 3), or obtain the ingredient having a sequential number equal to or smaller than a value obtained by multiplying the number of the ingredients included in the cooking information by a predetermined value less than 1 (e.g., 0.3). The ingredient ranked higher in the cooking information is highly likely to be a main ingredient of the dish. The main ingredient is likely to be an ingredient that the user pays attention to, and thus the simple method as described above can provide the effect similar to the other methods.

The related dish search unit 55 may search related cooking information with use of appearance frequency of a dish name included in a plurality of pieces of cooking information viewed (displayed on the cooking information screen) according to the instructions of the user in the past. In particular, the related dish search unit 55 totals appearance frequencies of dish names included in the pieces of cooking information viewed in a predetermined period of time (e.g., previous 30 minutes). If there is a dish name with the totaled appearance frequencies that are greater than a predetermined threshold value, for example, the related dish search unit 55 may search cooking information including the dish name and the ingredients selected by the ingredient selecting unit 54 (in the following, referred to as dish name search processing), and further, search related cooking information under a condition that does not include the dish name in addition to the search condition mentioned in the description of Step S113 (other dish search processing). The cooking information output unit 56 controls to display more number of the pieces of cooking information (e.g., titles included therein) obtained by the dish name search processing than the pieces of the cooking information (titles included therein) obtained by the other dish search processing, on the cooking information screen. When a dish name has high appearance frequency, it is expected that the user is highly likely looking for a recipe of the dish name. As such, the recipe that matches the user's purpose is expected to be displayed. Further, the other dish search processing enables to search cooking information on dish names other than the dish with high appearance frequency. Accordingly, it is possible to prevent only a specific dish name from being displayed, and thereby to increase variations of related cooking information to be displayed.

The invention claimed is:

1. A cooking information search device comprising:
   at least one processor; and
   at least one memory device that stores a plurality of instructions, which when executed by the at least one processor, causes the at least one processor to:
   obtain one of a plurality of pieces of cooking information from cooking information storage wherein each piece of cooking information includes information on a plurality of ingredients, cooking procedures and a first generic dish name, said obtaining being in response to a user's instruction;
   select one or more query ingredients from the plurality of ingredients included in the obtained cooking information;
   obtain one or more pieces of related cooking information that is retrieved from the cooking information storage, where the retrieved related cooking information includes a second generic dish name that is different from the first generic dish name and further includes the one or more query ingredients;
   wherein the second generic dish name uses at least one different ingredient or a different cooking procedure than the first generic dish name; and
   output data included in the obtained cooking information and the retrieved related cooking information so that the data is presented to the user.

2. The cooking information search device according to claim 1,
   wherein the plurality of pieces of cooking information respectively include, information titles, which are names representing dishes, and dish names indicating dish groups to which the dishes belong and generic names of dishes.

3. The cooking information search device according to claim 1,
wherein, in the related cooking information obtaining, the retrieved related cooking information is obtained under a condition that the retrieved related cooking information includes the part of the selected ingredients based on the appearance frequency of the first generic dish name included in the plurality of pieces of obtained cooking information in response to a user's previous instruction.

4. The cooking information search device according to claim 1,
wherein, in the cooking information obtaining, each piece of cooking information which includes information on a plurality of ingredients and cooking procedures is obtained based on a search condition entered by the user, one of a plurality of pieces of cooking information from the cooking information storage storing the plurality of pieces of cooking information, and
wherein, the related cooking information obtaining, the related cooking information retrieved from the cooking information storage is obtained under a condition that the related cooking information includes the part of selected ingredients and satisfies the search condition.

5. A cooking information search method comprising:
obtaining, with at least one processor operating with a memory device, one of a plurality of pieces of cooking information from cooking information storage, wherein each piece of cooking information includes information on a plurality of ingredients, cooking procedures and a first generic dish name, said obtaining being in response to a user's instruction;

selecting, with the at least one processor operating with the memory device, one or more query ingredients from the plurality of ingredients included in the obtained cooking information;

obtaining, with the at least one processor operating with the memory device, one or more pieces of related cooking information that is retrieved from the cooking information storage, where the retrieved related cooking information includes a second generic dish name that is different from the first generic dish name and further includes the one or more query ingredients;

wherein the second generic dish name uses at least one different ingredient or a different cooking procedure than the first generic dish name; and outputting, with the at least one processor operating with the memory device, data included in the obtained cooking information and the retrieved related cooking information so that the data is presented to the user.

6. The cooking information search device according to claim 5,
wherein, in the step of obtaining the related cooking information, the retrieved related cooking information is obtained under a condition that the retrieved related cooking information includes the part of selected ingredients based on the appearance frequency of the first generic dish name included in the plurality of pieces of cooking information obtained by the cooking information obtaining means in response to a user's previous instruction.

* * * * *